US012604286B2

(12) United States Patent
Chen

(10) Patent No.: US 12,604,286 B2
(45) Date of Patent: Apr. 14, 2026

(54) DISTRIBUTED EVENT-BASED COORDINATION MODEL

(71) Applicant: SEYO LIMITED, Greater London (GB)

(72) Inventor: Yanwen Chen, Greater London (GB)

(73) Assignee: Phinxt Robotics Limited, London (GB)

( * ) Notice: Subject to any disclaimer, the term of this patent is extended or adjusted under 35 U.S.C. 154(b) by 958 days.

(21) Appl. No.: 17/624,264

(22) PCT Filed: Jul. 2, 2020

(86) PCT No.: PCT/GB2020/051590
§ 371 (c)(1),
(2) Date: Dec. 31, 2021

(87) PCT Pub. No.: WO2021/001655
PCT Pub. Date: Jan. 7, 2021

(65) Prior Publication Data
US 2022/0361127 A1 Nov. 10, 2022

(30) Foreign Application Priority Data

Jul. 2, 2019 (GB) ..................................... 1909545

(51) Int. Cl.
*H04W 56/00* (2009.01)
*H04L 67/12* (2022.01)
*H04W 4/02* (2018.01)
(52) U.S. Cl.
CPC ......... *H04W 56/0025* (2013.01); *H04L 67/12* (2013.01); *H04W 4/025* (2013.01)
(58) Field of Classification Search
None
See application file for complete search history.

(56) References Cited

U.S. PATENT DOCUMENTS

| | | | |
|---|---|---|---|
| 10,299,079 | B1 | 5/2019 | Hurley et al. |
| 2007/0192452 | A1 | 8/2007 | Song et al. |

(Continued)

FOREIGN PATENT DOCUMENTS

| | | |
|---|---|---|
| CN | 203825790 U | 9/2014 |
| CN | 104960524 A | 10/2015 |

(Continued)

OTHER PUBLICATIONS

Zhenping Chen et al., "Event-triggered Communication for Distributed Time Synchronization in WSNs", 34th Chinese Control Conference, 2015, pp. 7789-7794.

(Continued)

*Primary Examiner* — Michael J Moore, Jr.
*Assistant Examiner* — Gautam Sharma
(74) *Attorney, Agent, or Firm* — IDEA Intellectual Limited; Sam T. Yip

(57) ABSTRACT

The present invention relates to coordinating tasks in a distributed mesh of systems, such as between autonomous vehicles, multi-camera systems, IoT distributed node systems and/or modular factories in a variety of use cases. More particularly, the present invention relates to coordinating events in a distributed mesh of systems based on parameters and constraints and can be used to provide a messaging arrangement that allows distributed systems to communicate and ensure that tasks are completed within the distributed system and/or at one or more nodes within the distributed system. Aspects and/or embodiments seek to provide a method for coordinating machines/nodes/devices of a distributed network, without a centralised system component, by synchronising devices of a distributed system without using an absolute timestamp. Instead, a logical, event-based dependency tree is collaboratively constructed by the nodes (Continued)

100 of a distributed network to manage decisions at each node of a distributed network.

19 Claims, 8 Drawing Sheets

(56) References Cited

U.S. PATENT DOCUMENTS

| | | | | |
|---|---|---|---|---|
| 2007/0233626 | A1 | 10/2007 | Rupp et al. | |
| 2013/0205128 | A1* | 8/2013 | Thompson | G06F 8/65 |
| | | | | 713/1 |
| 2015/0025708 | A1* | 1/2015 | Anderson | A61B 5/6804 |
| | | | | 340/463 |
| 2018/0234928 | A1* | 8/2018 | Yasukawa | H04W 92/18 |
| 2018/0255525 | A1* | 9/2018 | Uchiyama | H04W 56/0015 |
| 2018/0335781 | A1 | 11/2018 | Chase et al. | |
| 2019/0047559 | A1* | 2/2019 | Conde | B60W 50/14 |
| 2019/0317512 | A1* | 10/2019 | Zhang | G05D 1/0217 |
| 2020/0092685 | A1* | 3/2020 | Fehrenbach | H04W 36/08 |
| 2020/0207343 | A1* | 7/2020 | Vassilovski | G08G 1/167 |
| 2020/0344293 | A1* | 10/2020 | Wolter | G06F 8/60 |
| 2021/0197826 | A1* | 7/2021 | Baum | H04W 4/46 |
| 2021/0211348 | A1* | 7/2021 | Li | H04W 24/08 |
| 2022/0097690 | A1* | 3/2022 | Dede | B60W 30/143 |
| 2022/0174655 | A1* | 6/2022 | Tsai | H04W 72/20 |

FOREIGN PATENT DOCUMENTS

| | | | |
|---|---|---|---|
| CN | 106571046 | A | 4/2017 |
| CN | 109523807 | A | 3/2019 |
| EP | 0482761 | A2 | 4/1992 |
| JP | 2000269886 | A | 9/2000 |
| JP | 2001036937 | A | 2/2001 |
| JP | 2009048358 | A | 3/2009 |
| JP | 2011191814 | A | 9/2011 |
| JP | 2017507065 | A | 3/2017 |
| JP | 2018005799 | A | 1/2018 |

OTHER PUBLICATIONS

Written opinion of the international preliminary examining authority of the corresponding PCT application No. PCT/GB2020/051590 mailed on Jun. 4, 2021.

1st Office Action of the corresponding China patent application No. 202080048792.3 mailed on May 27, 2025.

1st Office Action of the corresponding Japan patent application No. 2021578224 mailed on Jul. 9, 2024.

1st Office Action of the corresponding Japan patent application No. 2021578224 mailed on Apr. 25, 2025.

* cited by examiner

100

C1

110

130

130

C3

120

C2

200

300

500

DISTRIBUTED EVENT-BASED COORDINATION MODEL

FIELD

The present invention relates to coordinating tasks in a distributed mesh of systems, such as between autonomous vehicles, multi-camera systems, IoT distributed node systems and/or modular factories in a variety of use cases. More particularly, the present invention relates to coordinating events in a distributed mesh of systems based on parameters and constraints and can be used to provide a messaging arrangement that allows distributed systems to communicate and ensure that tasks are completed within the distributed system and/or at one or more nodes within the distributed system at one or more substantially predetermined times.

BACKGROUND

Increasingly, manual tasks are being automated by machines and the machines being used to provide this automation are being improved such that they are becoming increasingly able to operate "intelligently", for example by considering risks such as infrastructure or human safety risks from automated distributed decisions. In particular, in industries like warehousing, logistics and automotive, huge improvements in efficiency have already been made while other industries like mining are only now becoming more automated.

The current paradigm requires stable centralised network connections to centrally co-ordinate all the autonomous devices and machines in a given operation, however, this isn't always possible. Specifically, if communication protocols such as LTE or 5G are used then typically either these are not fast enough or not ubiquitous in most geographical areas. The limitations of such centralised networks will be apparent and for example include the problem of having to set up a cell infrastructure in remote locations where none exists. In some situations, for example in underwater exploration, closed-pit mines, mountainous regions and space, it might not even be possible to deploy infrastructure economically. Furthermore, operating a centralised management server can provide a single point of weakness in an otherwise distributed system.

Thus, it would seem desirable to provide a method to avoid the need for central coordination of autonomous machines in such operations, which could then avoid problems arising from poor communication links between one or more of the machines.

However, current distributed networks are only typically used in specific use cases such as tethered mesh networking, web architectures and developer operations to scale web applications. These known implementations of distributed networks are, however, not yet applied to or adapted for safety critical applications (e.g. autonomous vehicles) because task synchronisation on a distributed network is not seen as reliable due to the lack of a common or "global" clock. In such distributed networks, each machine/system has its own internal clock, i.e. its own record of time, but it is hard to guarantee that all machines/systems have synchronised internal clocks. As an example, a deviation of 150 ms between internal clocks between nodes in a distributed system can mean a node that is an autonomous vehicle could have an estimated position miscalculated to be approximately 5 metres away, on a motorway, from its actual position relative to another node, again for example another autonomous vehicle that is a machine/system in the same network. As a result, even what seem like small time differences or synchronisation errors can lead to a high probability of serious errors and/or consequences when trying to centrally co-ordinate a number of nodes within a distributed system.

Further, where sequencing is based on time stamps, typically no or very little contextual information is exchanged between each machine/system or within a distributed sequencing process. The time stamp data exchanged can consume a significant portion of the available bandwidth in some configurations, especially if addressing information is included with the time stamp data. As a result, for decision making within sequencing or between machines/systems, this lack of contextual information limits decentralised decision making. However, increasing the amount of contextual information provided would also exacerbate the problem of bandwidth consumption by the data exchanges, which can already be limited by the amount of time stamp data exchanged.

SUMMARY OF INVENTION

Aspects and/or embodiments seek to provide a method for coordinating machines/nodes/devices of a distributed network, without a centralised system component, by synchronising devices of a distributed system without using an absolute timestamp. Instead, a logical, event-based dependency tree is collaboratively constructed by the nodes of a distributed network to manage decisions at each node of a distributed network.

Further aspects and/or embodiments seek to provide a method for coordinating tasks in a distributed system of nodes using local parameters and constraints to determine the best actor in a mesh for a particular task.

Further aspects and/or embodiments seek to provide distributed safety resolution to ensure that a node of a distributed network does not begin undertaking an action or new sequence of events that would put one or more other nodes within the network at risk (e.g. the risk of physical damage in the context of a cyber-physical system or, more generally, the (logical) risk of a deadlock scenario).

Further aspects and/or embodiments seek to provide a complex messaging arrangement or protocol for nodes in a distributed system to communicate in order to ensure tasks are completed effectively.

According to a first aspect, there is provided a method of event-based synchronisation of states for a distributed system of nodes, each node computing its own sequence of events, the method of computing the sequence of events at each node of the distributed system comprising the following steps: establishing communication between a plurality of neighbouring nodes; each of the neighbouring nodes determining a plurality of interdependent events between nodes of the plurality of neighbouring nodes; and each node communicating its state information to the neighbouring nodes such that each node can determine one or more states of the nodes of the plurality of neighbouring nodes; wherein each node is operable to react to the one of more states of nodes of the plurality of neighbouring nodes.

The use of an event-based synchronisation can allow coordination of nodes/machines/systems within distributed systems by removing the dependency of such systems on a time-based clock, and/or without the nodes/machines/systems having to go through a central dictator or server to manage tasks or events. More particularly, using this approach, when components of a distributed network are communicating with each other, there can be no reliance on an absolute time-based clock to synchronise the communications.

In this way, there is no need for the nodes of a network to be centrally connected and therefore can provide the flexibility to deploy a distributed system anywhere regardless of network availability.

Optionally, the event-based synchronisation comprises coordinating events for the plurality of neighbouring nodes so as to automatically accommodate a change of state for any neighbouring node during its sequence of events.

In doing so, each node can independently assess whether a change in the state of a neighbouring node will affect its sequence or state and, if so, how the changed state can affect its sequence. Once determined, each node can also change its own sequence of events to make sure the task is completed, and preferably safely.

Optionally, the step of establishing communication between a plurality of neighbouring nodes further comprises: sending a confirmatory communication request to the plurality of neighbouring nodes; and receiving one or more responses to the confirmatory communication request from one or more neighbouring nodes indicating their presence.

Before making any decisions or changes to any nodes' sequence, it is important to know which nodes in the system are close enough to connect to or cause disruption. This can also be called a discovery step.

Optionally, the step of establishing communication between a plurality of neighbouring nodes further comprises building a real-time map of the plurality of neighbouring nodes.

In some instances, knowing the proximity of the surrounding nodes or devices of a distributed system can provide a visual representation of the network in a certain area and can be useful when considering deploying additional nodes to the system and/or when planning to efficiently manage system resources.

Optionally, a node can detect external nodes that are in physical proximity, but are not part of the distributed network or the neighbourhood, and update its own sequence of events (or update the one or more external nodes) by observing the behaviour of such node: as a result, nodes like autonomous vehicles can cater for hybrid situations where non autonomous vehicles are involved. Optionally, the external nodes are within a geographic proximity of a node within the distributed network.

Optionally, determining a plurality of interdependent events comprises creating an event dependency trees of each of the plurality of neighbouring nodes. Optionally, the event dependency trees are created using logical time.

Using logical time can reduce the risk of unpredictable transmission time delays that occur in traditional systems. Although event-based logic is used, traditional time-based measurements can be used internally in a node but not within/between the rest of the system.

Optionally, the logical time is calculated based on the sequence of events for each of the plurality of neighbouring nodes.

In some instances, the logical time is determined after considering the sequence of events that need to happen in order for a particular task to be completed safely. Alternatively, the logical time can be determined relative to a position within the sequence of events.

Optionally, the step of each node communicating its state information to the neighbouring nodes comprises sending a state change query to neighbouring nodes. Optionally, upon receipt of the state change query, the neighbouring nodes determine whether the state change query is compliant with its sequence of events.

Each node can calculate whether a state change from a nearby node would result in a complication or disruption of its own state or sequence and whether it would stop the node from properly, and optionally safely, completing its original task.

Optionally, the step of each node communicating its state information to the neighbouring nodes further comprises locally processing state information received from neighbouring nodes to determine a new sequence of events for its own and neighbouring nodes to accommodate the change of state request and optionally sending a request to execute the new event sequences to neighbouring nodes.

This can also reduce the processing power needed by traditional centralised components as the processing steps can be distributed amongst the nodes or components in the distributed system.

Optionally, the new sequence of events is determined based on a variable sample rate.

For example, this can be based on a vehicle moving for a certain amount of time at a specific speed. Should this change, and the conditions are determined no longer to be safe, the method can adapt by updating/creating the sequence of events with a new sequence of events or stopping the update altogether.

Optionally, each node is operable to react to the one of more states in dependence upon local parameters. Optionally, the local parameters comprise any one or any combination of user defined parameters and/or predefined parameters.

Local parameters can be a number of properties such as proximity, speed, location, or a particular requirement depending on the node. The local parameters can be used to create a ranking system to determine which nodes would be able to complete a task that has entered the network or a new request from a node in the network. This data is often gathered when determining the neighbouring nodes and also can improve traditional task allocation as it is no longer predictive and/or centrally arbitrated, but it is based on local conditions of the network's components.

Optionally, each node is operable to react to the one of more states in dependence upon constraints. Optionally, the constraints comprise any of one or any combination of conditional constraints, dependent constraints, exclusive constraints, precedence constraints and/or coincidence constraints, optionally the conditional constraints comprise determining when a Boolean condition is satisfied.

Precedence constraints require an event to happen after a particular event, while coincidence constraints require events to happen at the same time.

Dependency constrains can relate to circumstance where one event depends on another event. As an example, and specifically for the automotive industry, a request to increase a vehicle's speed would not occur if the "start-engine" event has not occurred. Similarly, exclusive constraints can relate to making sure if one event takes place then another cannot. Again, continuing with an example for the automotive industry, a request to turn left and right cannot happen at the same time.

Optionally, the method operates without a timestamp system.

Specifically, when the method is implemented across the entire distributed system, or globally throughout the distributed system, the method does not rely on traditional time-based measurements for example absolute time stamps.

Optionally, sending and receiving data is processed through the same and/or separate communication channels. Optionally, the communication channel comprises any one or any combination of: wireless or wired connections.

Optionally, the sequences of events comprises one or more tasks to be carried out by each node of the distributed network.

Optionally, each of the nodes is operable to evaluate state changes of each of the neighbouring nodes and determine a sequence of events that avoids risks. Optionally, the risks comprises any one or a combination of physical or logical risks.

Optionally, the step of determining one or more states of the relevant nodes of the plurality of neighbouring nodes comprises determining a steady state of each of the plurality of neighing nodes.

According to a second aspect, there is provided a transmitter node operable to perform any one or any combination of the method steps described above.

According to a third aspect, there is provided a receiver node operable to perform any one or any combination of the method steps described above.

According to a fourth aspect, there is provided a system comprising a transmitter node according to the second aspect and a receiver node according to the third aspect. Each node in a distributed system can act as a transmitter and/or receiver of data within a distributed system. Accordingly, each node can also perform its own calculation and process data.

According to a fifth aspect, there is provided a system comprising means for carrying out any one or any combination of the method steps described above.

According to a sixth aspect, there is provided a computer program comprising instructions which, when the program is executed by a computer, cause the computer to carry out any one or any combination of the method steps described above.

BRIEF DESCRIPTION OF DRAWINGS

Embodiments will now be described, by way of example only and with reference to the accompanying drawings having like-reference numerals, in which.

SPECIFIC DESCRIPTION

Figure 1:
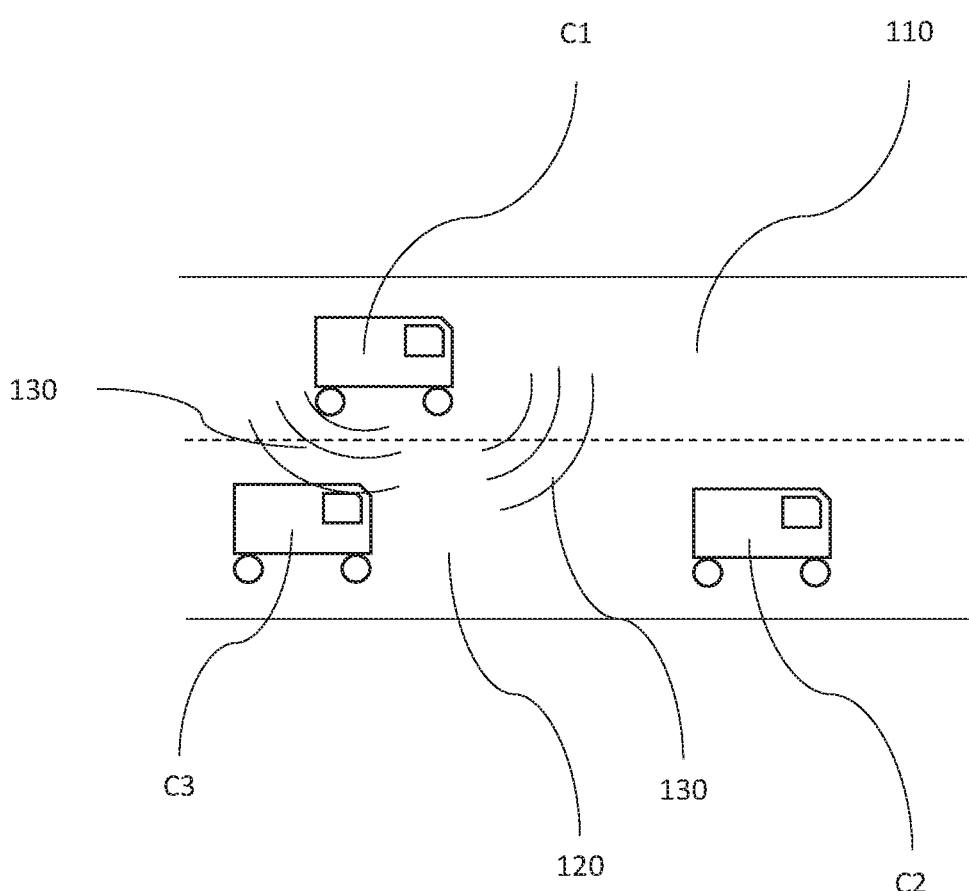
FIG. 1 shows an embodiment, in a discovery phase, where three autonomous cars determine in a distributed fashion how to allow one of the cars to merge into a lane with other autonomous cars.

In the paper "Timed-pNets: a communication behavioural semantic model for distributed systems" published in Frontiers of Computer Science—February 2015 (Front. Comput. Sci., 2015, 9(1): 87-110; DOI 10.1007/s11704-014-4096-4), a mathematical approach to build a communication behavioural semantic model for heterogenous distributed systems that include synchronous and asynchronous communications was proposed, which is incorporated herein by reference. This paper provides a mathematical description of how to construct event-based clock dependencies.

Building on the mathematical foundation set out in this paper, the following example describes an embodiment of the invention across a distributed network:

In a distributed network, a number of connected nodes (e.g., a, b, c . . . ) are able to communicate with one another through a direct and/or indirect channel. Any known wired and/or wireless forms of communication can be used to enable communication between nodes in the same distributed network. In some embodiments, nodes within a close proximity or nodes that affect a sequence of tasks of one or more other nodes within a distributed network may be considered to be within a neighbourhood of (neighbouring) nodes. In some embodiments, neighbouring nodes may be determined dynamically and/or considered to be a subset of nodes within a distributed network. As an example, all autonomous robots within a warehouse may be considered to be a distributed network (where each robot is a node of the network) whereas a group or smaller subset of these robots may be considered to be a neighbourhood of nodes of the distributed network. In some embodiments, each node of the distributed network is operable to determine its own neighbourhood of nodes, rather than a global determination of neighbouring nodes for each node of the distributed network. For example, if two nodes of a distributed network "node a" and "node b" are close to one another, they are likely to be in each other's neighbourhood of neighbouring nodes but each node may have different nodes within their respective neighbourhoods (e.g., neighbouring nodes of "node a": nodes b, e, l, r, c; and neighbouring nodes of "node b": nodes a, t, n, f). In some embodiments, a neighbourhood of nodes may include nodes from more than one distributed network.

In example embodiments, the current states of the nodes are usually monitored and are based on a previously defined consensus. Where the state is changing in accordance with the consensus of the system or distributed network, it is commonly referred to as being in a steady state. In some embodiments, a steady state is a condition that exists when all nodes in a neighbourhood have reached a consensus (agreed on which node should be doing what task/action and when). As an example, if a new node were to enter or interfere with the neighbourhood and start a new "intent phase", the whole neighbourhood ceases to be in a steady state condition. In some embodiments, the state changes correspond to actions that are performed by the node (e.g. "MOVING_FORWARD", "TURNING_LEFT", etc.). Thus, when a node within a neighbourhood of nodes is performing various actions of a sequence and changing states in an expected manner, based on a predefined consensus, it is considered to be operating in a steady state. In some embodiments, the actions carried out by each node of a network may be context dependent as they are based on the capabilities and/or function of a specific node. For example, when a node is coupled to a component within a robotic warehouse, the node could perform a "LIFT_SHELF" action, however, this type of action would not be relevant in the context of autonomous vehicles.

Throughout the network, each node periodically sends a heartbeat to its neighbouring nodes which allows each respective node to monitor the neighbouring nodes' respective statuses. In some embodiments, the status of a node corresponds to set of internal parameters for the node such as speed, direction, location, proximity, etc. In some embodiments, the heartbeat may enable construction of a real-time map of the surrounding nodes. In some embodiments, heartbeat messages are sent by each node continuously, through all stages of the process, and in this way the enables each node to determine whether all the conditions for a state change are met (e.g., starting to execute a new task/action). As an example, a heartbeat message may contain a node identifier and a set of parameters that are relevant to the specific application. As an example, in the context of some cyber-physical systems, these parameters may include the current position, the last known position and the rotation of the physical node across a three-dimensional axis.

If one or more nodes, have to complete a new action or a sequence of actions/events (that will ultimately alter the steady state of its neighbouring nodes), the one or more nodes will send an intent communication to the neighbouring nodes giving details on the intended action or sequences of actions/events. The intent communication may include an arbitrary set of parameters and constraints. In some embodiments, a node does not necessarily know that it will affect the steady state of a neighbouring node, but, as soon as the node enters its intent phase in order to determine whether its neighbouring nodes can execute a certain action or sequences of actions/events, a new consensus is needed and therefore the neighbourhood is no longer in a steady state.

Once the neighbouring nodes receive this payload information from the originating node (or nodes), they evaluate the impact the change will have on its own state and its neighbouring nodes' states. In some embodiments, the intent communication (payload information) of the intent phases includes a description of the action or sequences of actions/events the node is required to carry out. This description is then used by its neighbours (recipients of the intent communication) to determine whether it can execute the action or sequences of actions/events, and the impact on its own and neighbouring nodes' states. In example embodiments, in the intent phase, nodes may exchange messages to reach a consensus. Based on the evaluations by the neighbouring nodes, if the intent communication is deemed safe to proceed (for example, no deadlocks, race conditions, unsafe conditions, etc) the neighbouring node(s) will send back a positive consensus to the intent originating node(s), and optionally to the other neighbouring nodes. However, if the intent and its effect on the neighbouring node (or nodes) is deemed unsafe the "intent" message will be rejected. In some embodiments, some nodes may consider the intent to be safe to be executed and some nodes may consider the intent unsafe to execute. A positive consensus is necessary every time a node that is part of a distributed network, neighbourhood or close enough to affect a distributed network wants to enter a new state (i.e. execute a new action) because that may have a potential impact on the event sequences that are kept inside each of the neighbouring nodes. In some embodiments, one or more nodes' sequence of actions could be dependent on a sequence of actions of another neighbouring node, thus a positive consensus needs to acknowledged before altering the states of its neighbouring nodes.

As an example of safety evaluations performed by the nodes, the nodes can determine the likelihood of a deadlock scenario. Deadlocks can occur when there is a circular dependency between exclusive resource acquisitions performed by two or more concurrent threads or nodes. Typically, there needs to be more than one concurrent thread or node of execution for a deadlock to occur. When these concurrent threads attempt to gain exclusive access to some resource, it results in a deadlock. Exclusive access to a resource is often required for correctness in concurrent programs to prevent multiple threads or nodes from interfering with each other, but it is the requirement of exclusivity that can lead to a deadlock. For a deadlock to actually occur, there is usually a circular dependency: a ring of threads or nodes, each of which has acquired access to some exclusive resource, but desires access to another's resource. Due to the circularity, each thread is ultimately waiting upon itself to release its resource in order to proceed. Common deadlock scenarios include four vehicles at an intersection of a two-way road, or the well-known "dining philosophers' problem".

Another evaluation the nodes can perform is known as race conditions, or a race hazards. A race condition is when the output of a system or network is dependent on the timing or sequence of an uncontrollable event. This is very prevalent in multi-threaded and distributed environments. Race conditions can occur when two (or more) nodes that share the same memory space want to update a variable total having completed their independent events at substantially the same time. As an example, when two threads or nodes want to complete a task, both nodes will first read the initial variable total. Once the two nodes carry out their tasks, they will perform operations on the initial variable total based on the outcome of their tasks and then simultaneously attempt to update the initial variable total with their respective updated totals. However, since the variable total is shared between the two nodes, only the value of the node that sends its updated variable total last is preserved in the shared memory as it will overwrite any previous total, including an updated variable total from the other node. Thus, in race conditions, the output cannot be guaranteed as it depends on which thread or node finishes its task and sends its updated total last.

The evaluations performed by the nodes may also help determine which node or actor in the network is best suited to execute a task or sequence of events. This may be determined based on efficiency and/or safety. For example, in a robotic warehouse several robots (represented as nodes within a distributed network) can carry out tasks such as transporting objects from one location to another, by a certain deadline (e.g., within a time frame such as 5 minutes, 10 minutes, etc.). Upon evaluating the options, the nodes can select the first node to proceed with its state transition (i.e. execution of a sequence of actions/events set) based on the time proximity to its deadline. Alternatively, if the neighbourhood is facing a risk of a congestion within the warehouse, the nodes might select the node that is in a state which appears most often in the dependencies list of other nodes (i.e. blocks the highest number of nodes) to proceed. Additionally, in this way, processing information is distributed within the network and not conducted on a central system component (such as a server or a centralised software or hardware controller, for example a central master node in a mesh network).

Once the originating node(s) receives responses from the neighbouring nodes, the action is carried out by a node that is determined to be responsible for the first action or event in the sequence, providing there is no preceding dependency for that node on another action or actions (e.g. the action can be carried out independently or in parallel to one or more other actions at one or more other nodes). If there is a preceding dependency, which may render the new action, event or sequence unsafe, the original intent will be aborted, and sequence discarded. In some embodiments, the sequence may be discarded or aborted based on a consensus message from one or more nodes that denies the consent to the state transition in response to the initial intent message.

Based on the intent message and the new actions/events, if and when nodes enter an execution state, the executing nodes will be monitoring their states to ensure the actions or sequence of events are being conducted in the correct sequence and as agreed to maintain the integrity and safety of the system. Once a node completes its event in the sequence, it will report to its neighbours the completion and its current state. This will trigger the following event in the sequence if available. Once all the involved nodes have completed the execution stage, the system once again enters a steady state.

In some instances, new priority intent messages can be inserted into a network to execute an action or sequence of events before a previously issued intent, based on any arbitrary parameter defined by the system/network. In other cases, whenever a new intent message is sent into the system, before the action can safely be executed, safety of the new event is considered and the new intent will only be executed whenever it safe to do so.

Referring now to FIGS. 1 to 4, an example embodiment will now be described in relation to the use of this approach in autonomous vehicles that provides a method for coordinating tasks in a distributed network/mesh based on parameters and constraints, which provides a complex messaging arrangement that allows the machines in a distributed network to communicate amongst themselves to ensure tasks are completed effectively.

In FIGS. 1 to 4, the example embodiment shows a situation that involves three autonomous cars C1, C2, C3 which are driving along a dual carriageway road (i.e. a road with two lanes, which both lanes have traffic going in the same direction). The first car C1 is driving along in the first lane and is intending to merge into the other lane of the road. The second car C2, is driving along in the second lane (that the first car C1 is intending to merge into). The third car C3, is driving along in the second lane behind the second car C2.

With reference to FIG. 1, the first car C1 is in a "discovery" phase and attempts to establish a connection with any neighbouring vehicles. In some embodiments, the event-based dependency tree is collaboratively constructed by the nodes of a distributed network. In some embodiments, the neighbourhood of nodes can be determined by the nodes within a certain area or based on interdependencies (e.g., nodes that are relevant) to carry out one or more sequence of actions. In this example, the relevant vehicles are the second car C2 and the third car C3. The first car C1 does this by issuing a "heartbeat" command 130 via a common communication channel to any nearby vehicles and in this example will receive a response from the second car C2 and the third car C3 back via the same communication channel.

Preferably, the connections are established to get a current state of the other vehicles before making any decisions at any node.

Figure 2:
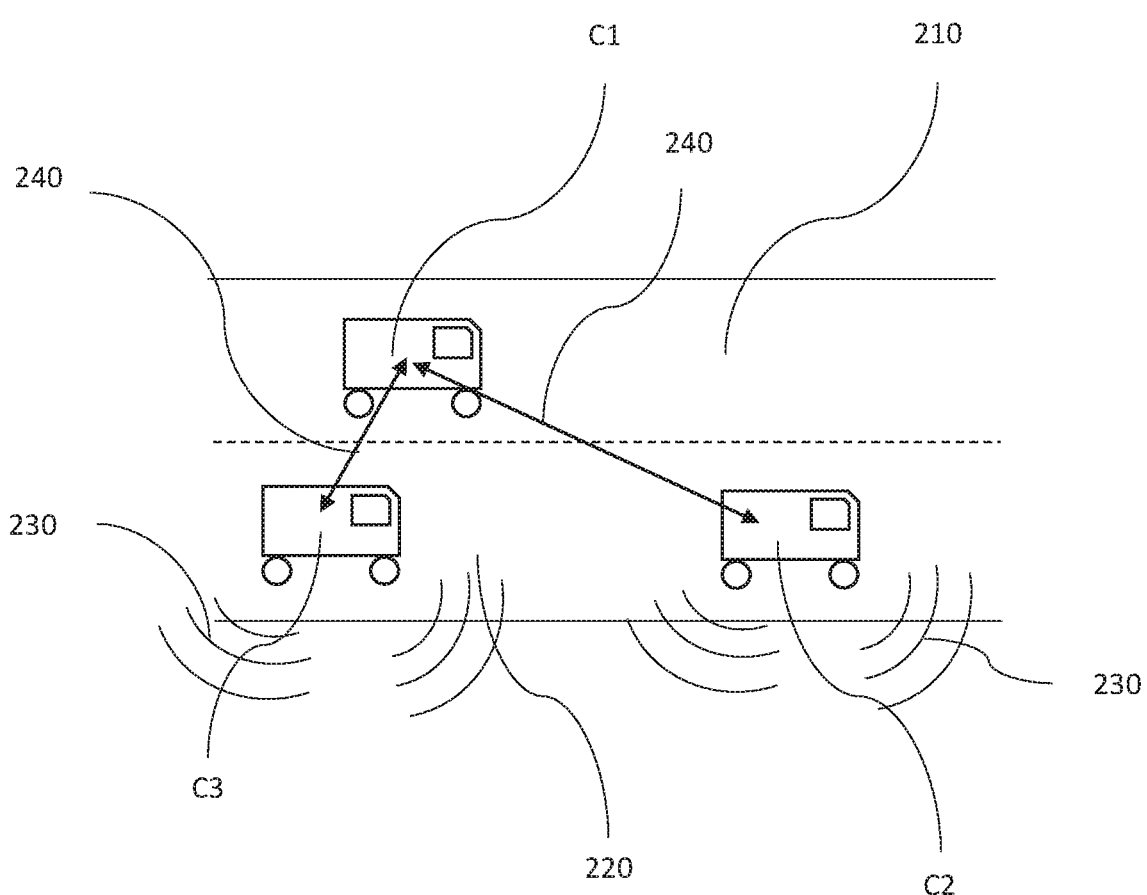
FIG. 2 shows an embodiment, in an intent phase, where three autonomous cars determine in a distributed fashion how to allow one of the cars to merge into a lane with other autonomous cars.

With reference to FIG. 2, the first car C1 enters the "intent" phase and sends a request 240 via the communications channel to the second and third cars C2, C3 to be inserted in between the second and third cars C2, C3 in their lane of the road 220. The second and third cars C2, C3 then in turn communicate onwards the request from the first car C1 with the neighbouring vehicles of the second and third cars C2, C3 respectively to ensure that each of the second and third cars C2, C3 can complete the required tasks safely. If the second and third cars C2, C3 agree (as well as any neighbouring cars to the second and third cars C2, C3) that the task is deemed to be safe (a positive consensus), then the execution phase can begin.

Figure 3:
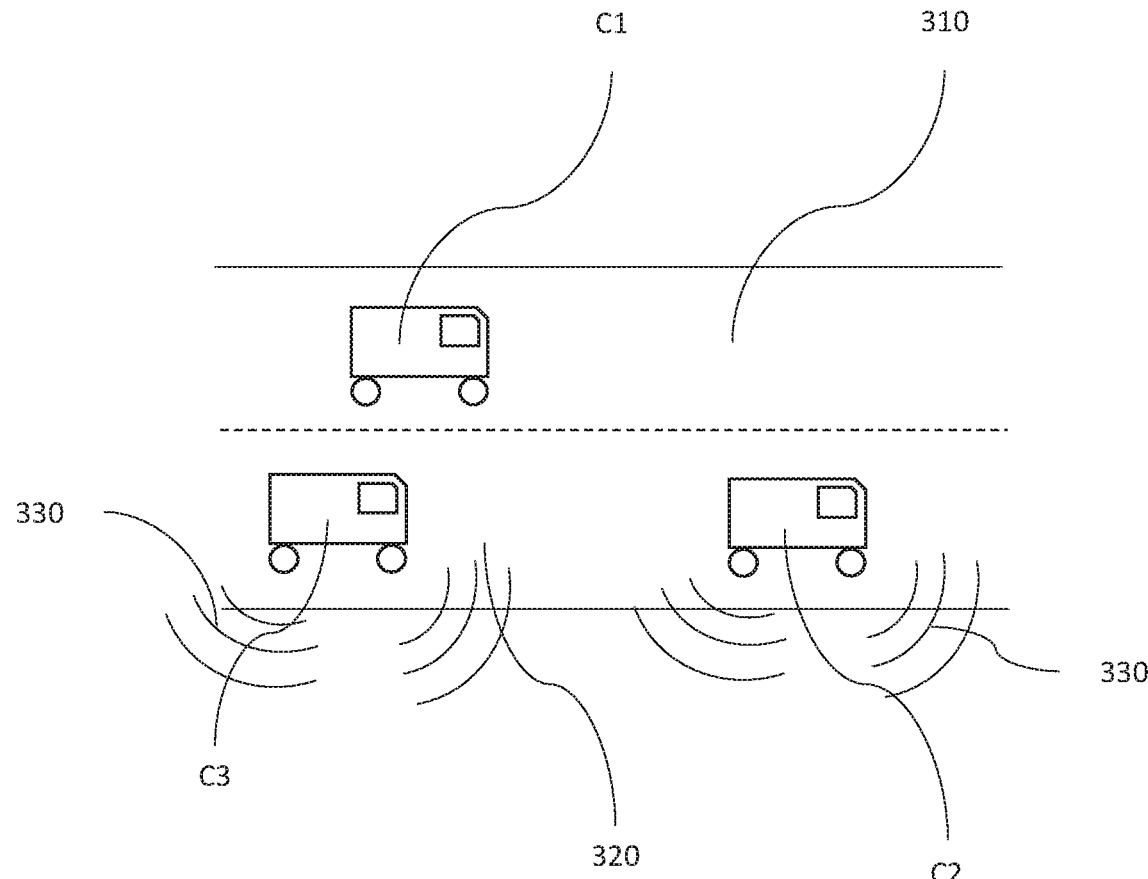
FIG. 3 shows an embodiment, in an execution phase, where three autonomous cars determine in a distributed fashion how to allow one of the cars to merge into a lane with other autonomous cars.

With reference to FIG. 3, the first car C1 enters the "execution" phase and requests the current state (e.g., speed, direction, location, etc.) of the second and third cars C2, C3 through the communications channel. The first car C1 then computes, using the acquired states of the second and third cars C2, C3, a determination of the correct course of action that needs to be safely completed in respect of the required task or tasks. In this example, the first car C1 determines that the second car C2 must accelerate by 5 miles per hour (mph) for 30 seconds and the third car C3 must decelerate by 5 mph for 30 seconds in order to create a safe entry point of a distance of three times the length of the first car C1 in between the second and third cars C2, C3 for the first car C1 to move into in the second lane 320 of the road in between the second and third cars C2, C3. The first car C1 then communicates these determined requests for acceleration by the second car C2 and deceleration by the third car C3 via the communications channel. The second and third cars C2, C3 then receive these requests and confirm with any of their respective neighbouring vehicles to ensure that the requests maintain safety. Once all of the checks have been made with any neighbouring vehicles and the second and third cars C2, C3, the second and third cars C2, C3 approve the execution phase and the distributed tasks are performed by the respective vehicles C1, C2, C3 until the calculated ideal (relative) positions are achieved by the participating actors C1, C2, C3. During execution, each node C1, C2, C3 samples the state of itself and any neighbouring nodes C1, C2, C3 at a variable sample rate and can be triggered at any inflection (e.g. if the steady state of the system is broken, one of the cars C1, C2, C3 brakes suddenly or one of the cars C1, C2, C3 turns suddenly).

Figure 4:
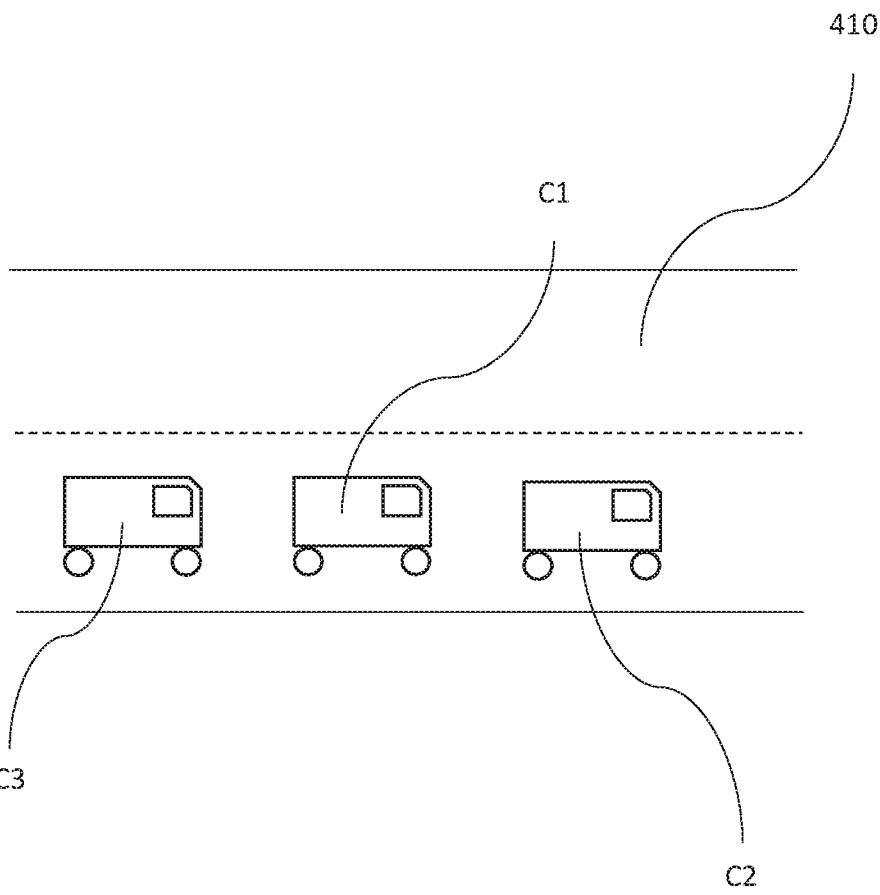
FIG. 4 shows the executed task of one car merging into a lane with other autonomous cars.

Once the task is completed, as depicted in FIG. 4, the three-phase cycle repeats itself continuously. In other words, once the task is completed, the system/network enters a new steady state where heartbeats from each node are continuously sent to neighbouring nodes in the system/network. The full cycle is reinitiated if there is a change in the steady state or a new intent is propagated. Optionally, at the end of every cycle, the safety of the task to be completed can be determined.

Referring now to FIGS. 5 to 8, another embodiment will now be described in relation to the use of this approach in robotic warehouses.

In FIGS. 5 to 8, the example embodiment shows a situation that involves four autonomous robots R1, R2, R3, R4 (i.e. nodes), which are moving along different corridors of a warehouse. In this example, each robot is moving towards the intersection of the four corridors without being aware of the direction of the other robots, their intended destinations or sequences of actions.

Figure 5:
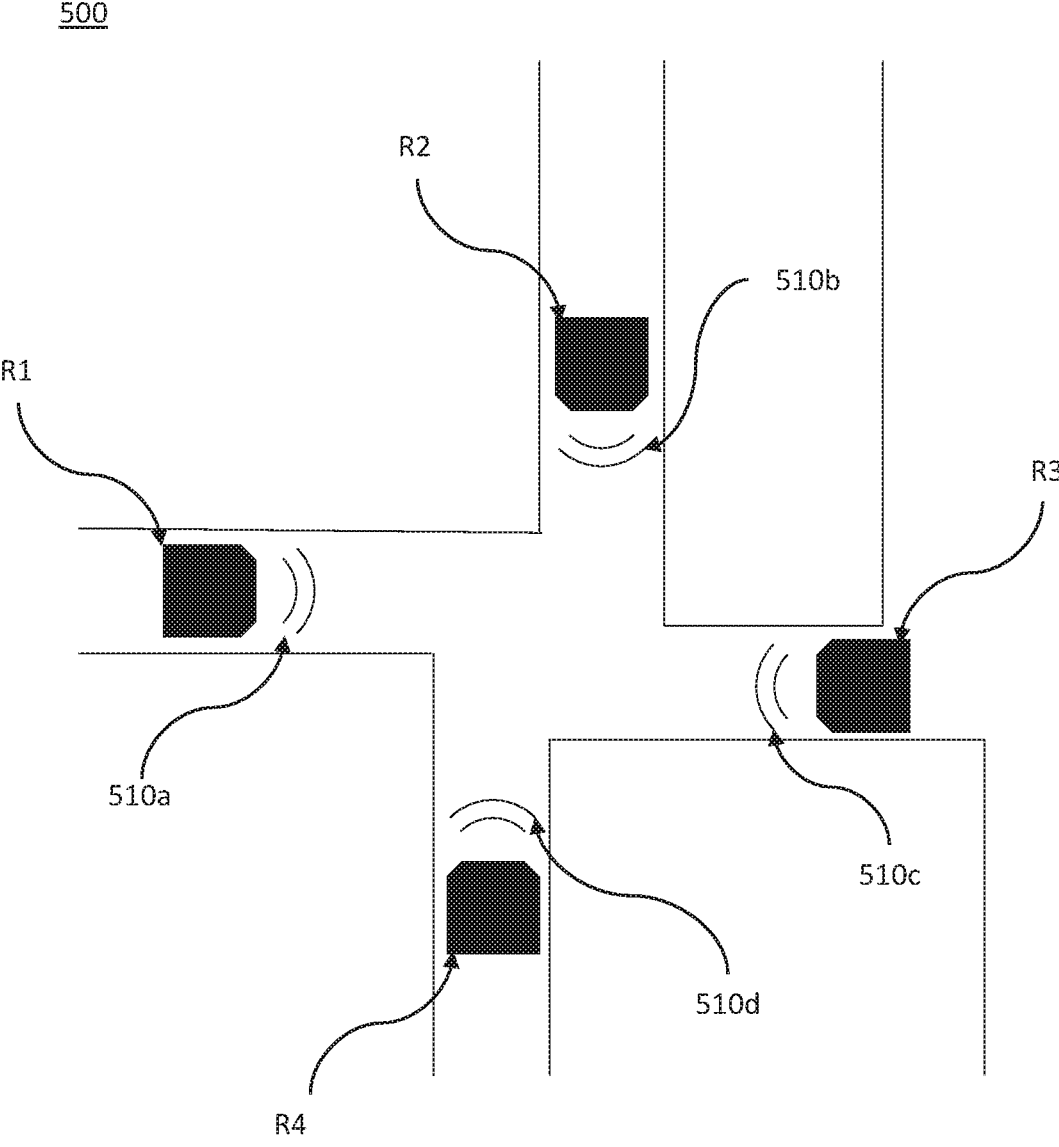
FIG. 5 shows an embodiment, in a discovery phase, where four autonomous robots determine in a distributed fashion how to access an intersection between corridors and avoid deadlocks.

With reference to FIG. 5, as each robot R1, R2, R3, R4, approaches the intersection, they are in a "discovery" phase and attempt to establish a connection with any neighbouring robots. In this example, the relevant robots are R1, R2, R3 and R4. Each robot does this by issuing a "heartbeat" command 510*a*, 510*b*. 510*c*, 510*d*, via a common communication channel to any nearby robots. For example, as previously mentioned, the heartbeat command/communication may include the nodes' status. In this example, each robot will receive a response back from each of the other robots via the same communication channel.

Figure 6:
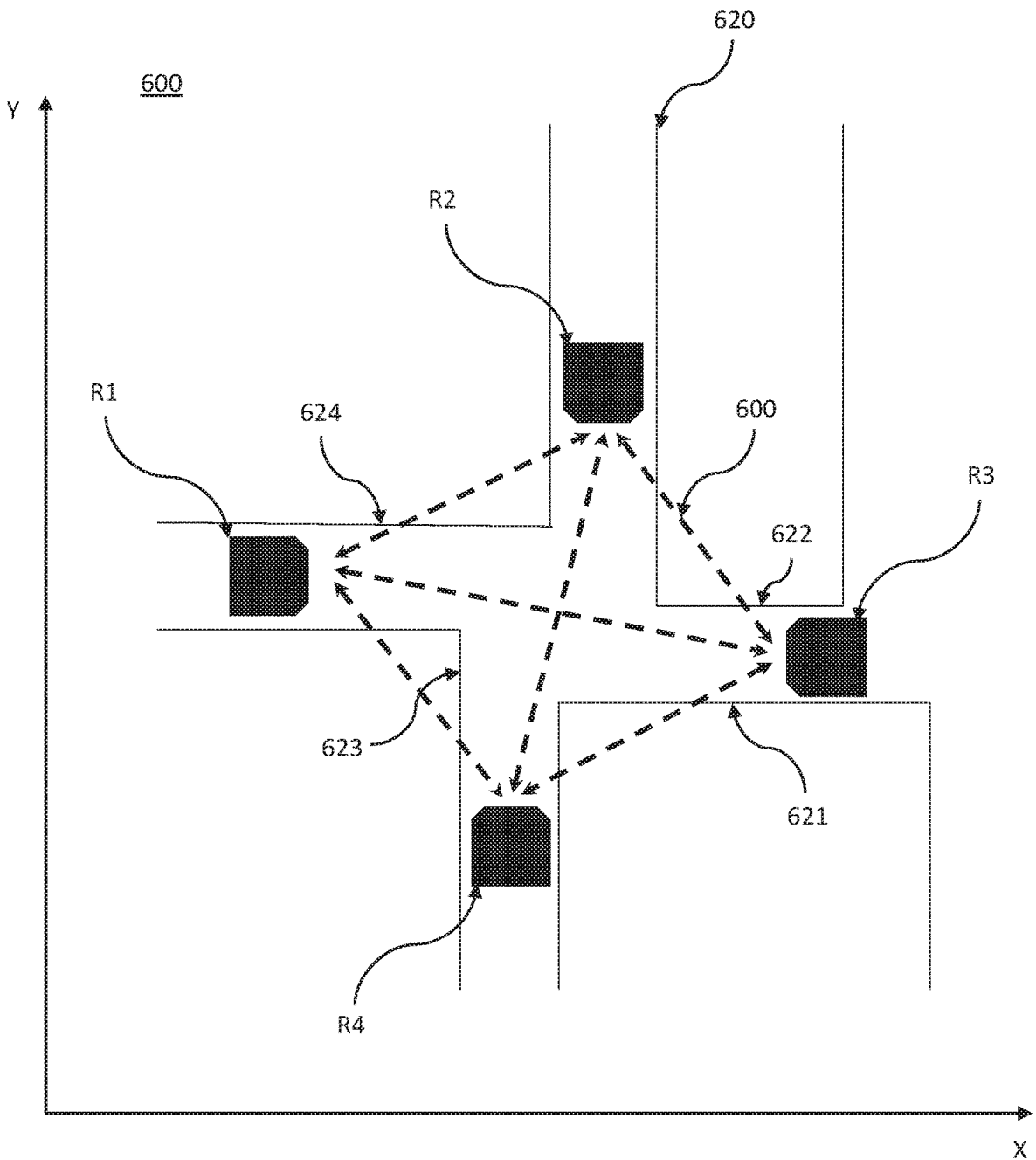
FIG. 6 shows an embodiment, in an intent phase, where four autonomous robots determine in a distributed fashion how to access an intersection between corridors and avoid deadlocks.

Next, with reference to FIG. 6, each robot enters the "intent" phase and sends a request 610 (which indicate the intended action or sequence of actions), to the neighbouring robots. As an example, FIG. 6 also shows a X/Y cartesian axis system that the robots could use to express their intents or locations. Robot R1 declares that it wants to move along the X axis in a positive direction (i.e. "MOVE_EAST") by a distance $d_{r11}$ (until it reaches the wall 620 of the warehouse), then it wants to move along the Y axis in a negative direction (i.e. "MOVE_SOUTH") by a distance $d_{r12}$ (until the wall 621 of the warehouse), then it wants to "MOVE_EAST" by distance $d_{r13}$ (until there wall 622 is no longer an obstruction in its north direction) and finally it wants to move along the Y axis in a positive direction (i.e. "MOVE_NORTH") by a distance $d_{r14}$. Similarly, robot R2 declares that it wants to "MOVE_SOUTH" until the wall 621, then "MOVE_EAST" until wall 621 is no longer an obstruction in its south direction and, finally, "MOVE_SOUTH". Robot R3 declares that it wants along the X axis in a negative direction (i.e. "MOVE_WEST") until it reaches the wall 623, then it wants to "MOVE_NORTH" until it reaches the wall 624 and, finally, it wants to "MOVE_WEST". Robot R4 declares that it wants to "MOVE_NORTH" until it reaches the wall 624, then "MOVE_EAST" until it reaches the wall 620 and, finally, "MOVE_NORTH".

Figure 7:
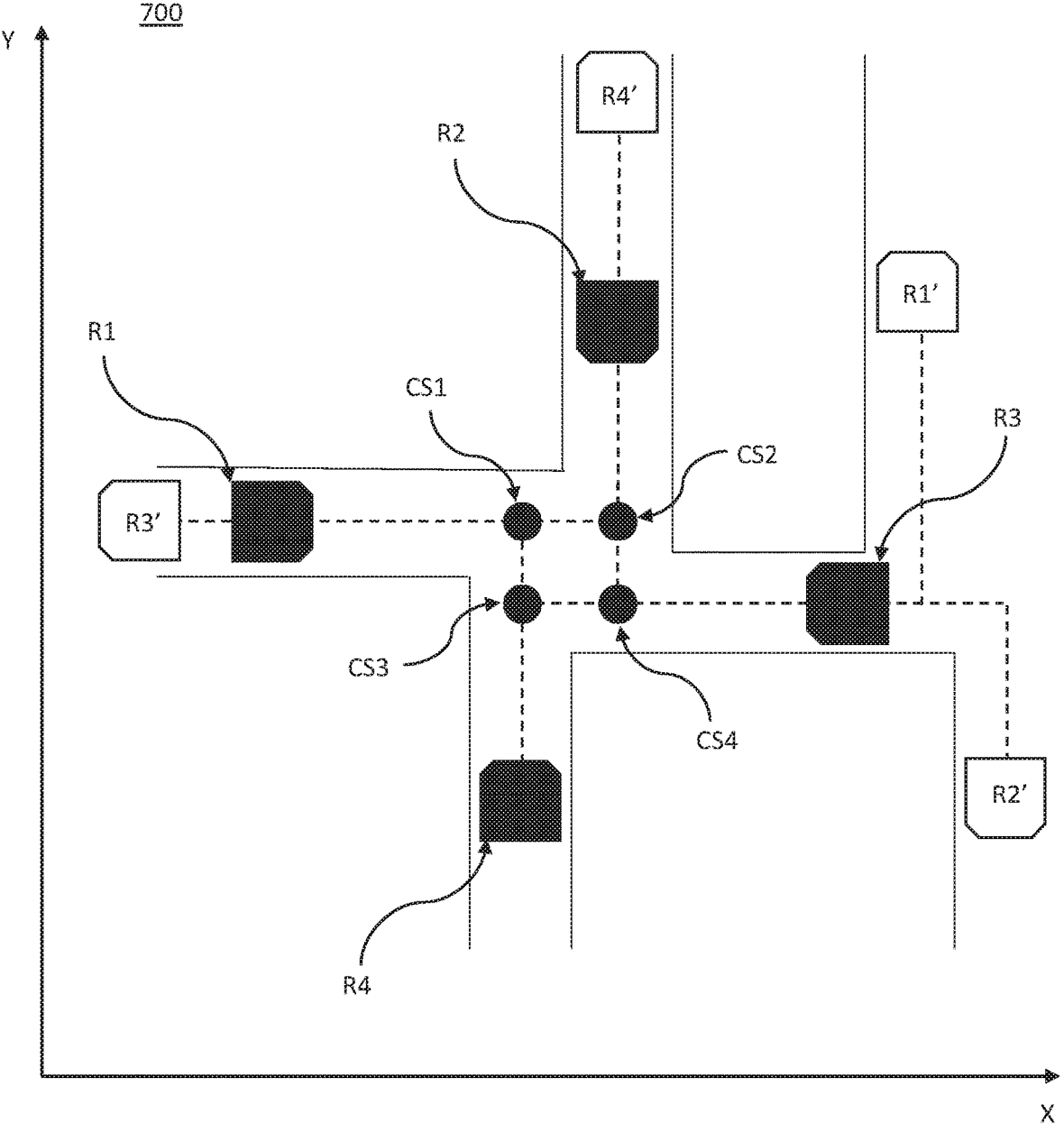
FIG. 7 shows an embodiment, in an intent phase, where four autonomous robots have communicated their intents to each other and have identified a critical section, which consists of locations CS1, CS2, CS3, CS4.

With reference to FIG. 7, the robots have now computed a common list of events and all the dependencies (e.g., all the interdependent events between all the nodes). For example, each robot knows where each robot is intending to move R1', R2', R3', R4'. Additionally, FIG. 7 shows four locations of the intersection CS1, CS2, CS3, CS4 which represents the critical sections of the intersection or of the paths. This is the area where synchronisation is crucial to avoid deadlocks. Given the initial coordinates of the robots, robot R1 determines that robot R3 must be in a X coordinate that is less than the X coordinate of CS4 (i.e. R3.$x$<CS4.$x$) and in a Y coordinate that is less than the Y coordinate of R1 (i.e. R3.$y$<R1.$y$), for it to be able to carry out its events sequence. R2 also determines that R3.$x$<CS4.$x$ must apply for it to be able to carry out its events sequence. R3 determines that R1.$x$>CS1.$x$ must apply for it to be able to carry out its events sequence. Finally, R4 determines that R2.$y$<CS2.$y$ must apply for it to be able to carry out its events sequence. As mentioned above, nodes can reach consensus on the event ordering based on which node is blocking the highest number of neighbouring nodes. In this case, both R1 and R2 depend on R3, so they consent on R3 moving to the CS3 location, which is the closest location that satisfies both the R3.$x$<CS4.$x$ and R3.$y$<R1.$y$ constraints. Having R3 entered the "execution" phase and moved to CS3, R1 requests the permission to move into CS2. R2 could potentially deny it, however, because nodes are using a criterion that is aimed at minimising the number of nodes inside the critical section at the same time and because R1 must enter the critical section for R3 to be able to exit it, R2 provides consent and R1 moves into CS2.

Figure 8:
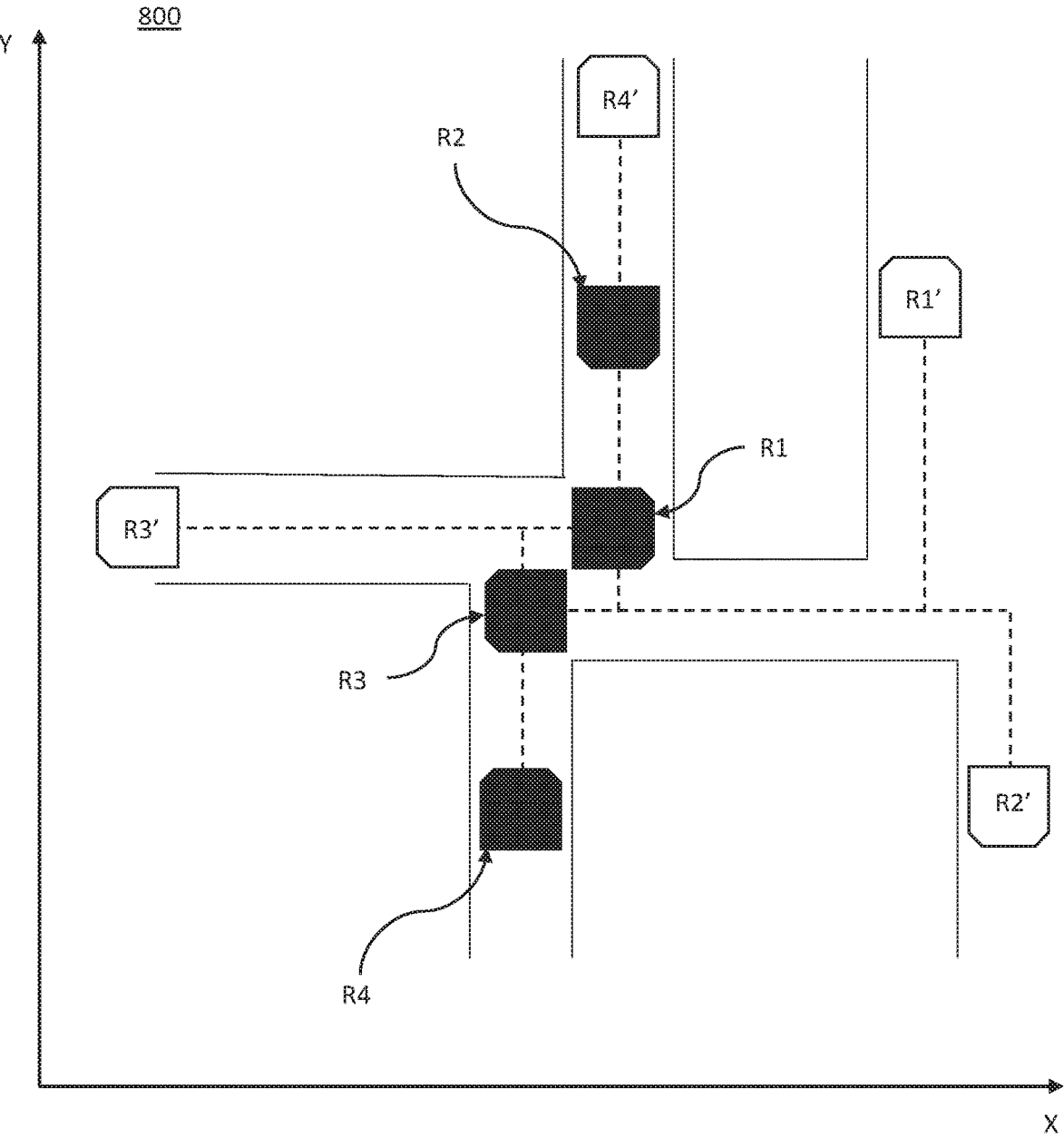
FIG. 8 shows an embodiment, in an execution phase, where two of the robots have moved into the intersection without causing a deadlock.

With reference to FIG. 8, the robots/nodes are now in the "execution" phase and both R3 and R1 have moved inside the critical section. At this point, because the neighbourhood will try to minimise the number of nodes that concurrently access the critical section, every time R1 and R3 will re-enter the "intent" phase to ask their neighbours whether they can proceed with the next state transition, both R2 and R4 will provide consent. Once both R1 and R3 are out of the critical section, R2 and R4 will carry out the remaining intent/execution cycles by following the previously defined constraints. As mentioned above, a priority intent system may also be implemented. For example, in some embodiments, a priority intent message could be used by ambulances, police vehicles, fire engines, etc, which would give them more importance over civilian vehicles to conduct a sequence of events or tasks. In other words, a new action by first responder or an emergency vehicle would supersede actions or events requested by other civilian vehicles.

In embodiments, logical time is calculated on event-based sequences. Generally, each event has two instant actions: a start action and an end action. For example, a car braking can be modelled as a "start braking" action and an "end braking" action and the condition required to trigger the "end braking" action could be the when the car's speed drops to zero.

For other events, for example, having a waiting event, a local clock (traditional time-based measurement) can be used to determine the duration of an event. However, the use of a local time-based clock does not determine or influence the logic clock constraints across the different devices in the distributed system, or the distributed system as a whole. As opposed to using absolute-time based scheduling, which can be hard to synchronise and can be spoofed, this embodiment uses event-based scheduling.

Other applications for this invention may include multiple co-ordinated cameras/multi-camera setup, IoT devices or modular factories.

As an example, in multi-camera setups for films and TV, instead of relying on timestamp information of each camera to synchronise the video frames and/or audio data in editing, triggers in the digital output created by the camera can be converted into intents or events, for example, a variation in the audio profile, a change in the colour profile, a change in scene composition, scene luminance, etc.

These events can then be used to create a logical sequence which can be used to synchronise the timelines of the multiple cameras and in some instances even automatically determine the offset before feeding the data into editing software.

Similarly, factories are developing into the concept of modular factories. Typically, traditional factories are very efficient at fixed outputs and occasionally can ramp down production when there is no change to the process. However, these traditional factories cannot cope well with a sudden increase in demand (for example to cater for commercial celebrations such as Mother's Day) nor can they cope well with a limited run of a product that deviates from the predetermined process of the factory.

Modular factories provide a solution to this problem by allowing factories to build modular setups that can scale on demand and introduce new steps or components where needed.

Embodiments disclosed herein can also be used with modular factories to allow them to work very easily and in a true plug and play paradigm. A handover and takeover intent would be defined in the system and each factory hardware unit would have that programmed in. Therefore, when a new unit or component is introduced to the process, they establish a sequenced driven connection to their neighbours and can immediately work together with no risk of error.

In the embodiments and aspects herein described, the communications hardware used to provide communications between the machines/systems/vehicles can be a DSRC (Dedicated Short Range Communication) module which can provide the advantage of being full-duplex and can provide the advantage that, as the frequency at which these modules typically operate is typically protected by government regulation from other communications protocols such as consumer wireless networking, there is less likelihood of interference or lack of bandwidth due to traffic congestion on that communication channel. Optionally, the use of any wired and/or wireless communication medium can be used to transfer data within a distributed network. In some embodiments, the nodes may include one or more sensors to determine one or more nodes within a certain proximity. In some embodiments, these additional, or external, nodes can be considered to be external actors that do not depend on or affect the sequences of any node within a distributed network or a neighbourhood of nodes. In some embodiment, the nodes may include sensors or transmitters for propagating one or more sequences of actions or states to other nodes within the distributed network (and neighbourhood of nodes), or to external actors (external nodes) within a close proximity (e.g., a geographic proximity).

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

The invention claimed is:

1. A method of event-based synchronisation of states for a distributed system of moveable, physical nodes, the method comprising:
    each node computing its own sequence of events; and
    computing the sequence of events at each node comprising the following steps:
        establishing communication with a plurality of neighbouring ones of the nodes;
        each node determining a plurality of interdependent events between relevant nodes of the plurality of neighbouring nodes and agreement on the interdependent events, each of the interdependent events relating to node movement; and
        each node communicating its state information to its neighbouring nodes such that each of its neighbouring nodes monitors one or more states of the relevant nodes of its neighbouring nodes during execution of the events;
    wherein each node is operable to react to the one or more states of the relevant nodes of its plurality of neighbouring nodes.

2. The method of claim 1 wherein the event-based synchronisation comprises coordinating events for the plurality of neighbouring nodes so as to automatically accommodate a change of state for any neighbouring node during its sequence of events.

3. The method of claim 1 wherein the step of establishing communication between the plurality of neighbouring nodes comprises:
    sending a communication request to the plurality of neighbouring nodes; and
    receiving one or more responses to the communication request from one or more neighbouring nodes indicating their presence as a neighbouring node.

4. The method of claim 1 wherein each node of the distributed system or plurality of neighbouring nodes can detect one or more relevant external nodes, wherein the external nodes are not part of the distributed system of nodes or plurality of neighbouring nodes, and update its own and/or the one or more relevant external nodes' sequence of events by observing the behaviour of said one or more relevant external nodes, wherein the relevant external nodes are within a geographic proximity of the node.

5. The method of claim 1 wherein the determining the plurality of interdependent events comprises creating an event dependency tree for each of the neighbouring nodes.

6. The method of claim 5 wherein the event dependency trees are created using logical time, wherein the logical time is calculated based on the sequence of events for each of the plurality of neighbouring nodes.

7. The method of claim 1 wherein the step of each node communicating its state information to the neighbouring nodes comprises sending a state change query to neighbouring nodes.

8. The method of claim 7 wherein, upon receipt of the state change query, the neighbouring nodes determine whether the state change query is compliant with its sequence of events.

9. The method of claim 7 wherein the step of each node communicating its state information to the neighbouring nodes further comprises locally processing state information received from neighbouring nodes to determine a new sequence of events for its own and neighbouring nodes to accommodate the change of state query.

10. The method of claim 9 further comprising sending a request to execute the new event sequences to neighbouring nodes.

11. The method of claim 9 wherein the new sequence of events is determined based on a variable sample rate.

12. The method of claim 1 wherein each node is operable to react to the one of more states in dependence upon local parameters, wherein the local parameters comprise one or more of: location, speed, direction and proximity.

13. The method of claim 1 wherein each node is operable to react to the one of more states in dependence upon constraints, wherein the constraints comprise any of one or any combination of conditional constraints, dependent constraints, exclusive constraints, precedence constraints and/or coincidence constraints, optionally the conditional constraints comprise determining when a Boolean condition is satisfied.

14. The method of claim 1, wherein each node is operable to evaluate state changes of each of the neighbouring nodes and determine a sequence of events that avoids risks, wherein the risks comprise any one or a combination of physical or logical risks.

15. The method of claim 1, further comprising determining one or more states of the nodes of the plurality of neighbouring nodes, comprising comprises determining a steady state of each of the plurality of neighbouring nodes.

16. The method of claim 1, wherein the distributed system of nodes lacks a centralised system component, wherein the centralised system component comprises any or any combination of: a central server; a master node; or a centralised control component.

17. The method of claim 1, wherein the neighbouring nodes of each node can be different.

18. The method of claim 17, wherein the establishing communication comprises each node dynamically determining its neighbouring nodes.

19. A system carrying out the method of claim 1.

\* \* \* \* \*